United States Patent [19]

Cutburth et al.

[11] Patent Number: 4,772,109
[45] Date of Patent: Sep. 20, 1988

[54] PRECISION ADJUSTABLE STAGE

[75] Inventors: Ronald W. Cutburth, Tracy; Leonard L. Silva, Livermore, both of Calif.

[73] Assignee: The United States of America as represented by the United States Department of Energy, Washington, D.C.

[21] Appl. No.: 911,845

[22] Filed: Sep. 26, 1986

[51] Int. Cl.⁴ .................. G02B 21/26; G02B 27/00
[52] U.S. Cl. ................................ 350/531; 350/319; 108/137
[58] Field of Search .............. 350/319, 531; 248/D13; 108/137

[56] References Cited

U.S. PATENT DOCUMENTS

| 616,760 | 12/1898 | Baker | 350/319 |
|---|---|---|---|
| 3,124,018 | 3/1964 | Gough | 248/D13 |
| 3,334,541 | 8/1967 | Delp | 350/531 |
| 3,495,519 | 2/1970 | Alfsen et al. | 108/137 |
| 3,508,806 | 4/1970 | Hall | 350/531 |
| 3,638,933 | 2/1972 | Burnett et al. | 108/137 |
| 4,126,376 | 11/1978 | Gommel et al. | 350/531 |

FOREIGN PATENT DOCUMENTS

| 2751207 | 5/1979 | Fed. Rep. of Germany | 350/531 |
|---|---|---|---|
| 685573 | 12/1939 | Fed. Rep. of Germany | 350/90 |

Primary Examiner—John K. Corbin
Assistant Examiner—Ronald M. Kachmarik
Attorney, Agent, or Firm—P. Martin Simpson, Jr.; L. E. Carnahan; Judson R. Hightower

[57] ABSTRACT

An improved mounting stage of the type used for the detection of laser beams is disclosed. A stage center block is mounted on each of two opposite sides by a pair of spaced ball bearing tracks which provide stability as well as simplicity. The use of the spaced ball bearing pairs in conjunction with an adjustment screw which also provides support eliminates extraneous stabilization components and permits maximization of the area of the center block laser transmission hole.

6 Claims, 2 Drawing Sheets

PRECISION ADJUSTABLE STAGE

FIELD OF THE INVENTION

The U.S. Government has rights in this invention pursuant to Contract No. W-7405-ENG-48 between the U.S. Department of Energy and the University of California for operation under Lawrence Livermore National Laboratory.

The present invention relates to precision mounting and adjuster apparatus and, in particular, to adjustable mounts or stages for optics systems.

BACKGROUND OF THE INVENTION

While the adjustable mount of the present invention is described relative to use in a laser system, it will be apparent from the description that the precise positioning capability and relative simplicity of construction make the present mount widely applicable wherever adjustable mounts can be used.

In laser systems, it is critical that the propagating beam be precisely aligned. Alignment may involve both detection of the beam path and adjustment of that path. For example, copending commonly assigned Cutbruth U.S. patent application Ser. No. 573,251, filed Jan. 23, 1984, now abandoned entitled "Three-Point Spherical Mirror Mount", discloses a concurrently developed mirror mount for precisely adjusting mirrors to the desired orientation. In one aspect, this mirror mount uses a three-point mounting system to thereby eliminate the prior art requirement of perfectly machining and aligning the spherical inner ring mirror mount and the mating outer spherical housing.

The present invention relates specifically to adjustable mounts or stages which mount electromagnetic sensors that detect the laser beam position. As shown in FIG. 1, a typical prior art stage 10 includes a metal center block 11 which is slidably mounted on a pair of side ball bearing assemblies 12—12. A laser beam (not shown) is transmitted through the center hole 13 and detected by an electromagnetic device (not shown) located in or aligned with the center hole. The center block 11 is also slidably mounted on a pair of frame guide shafts 14—14 for reversible position adjustment, as indicated by arrow 15. A micrometer-type adjuster 16 is mounted to frame end rail 17. Upon inward rotation, the adjuster 16 pushes against the left side of center block 11 and thereby moves the block to the right, against the biasing action of shaft-mounted compression springs 18—18. When the micrometer adjuster 16 is retracted, the biasing springs 18—18 move the center block in the opposite, leftward direction.

Like the prior art conventional spherical mirror mounts discussed in my above-mentioned patent application, the prior art stage 10, FIG. 1, must be machined with extremely high precision to provide the necessary accuracy and stability. Specifically, the side V-grooves 21 in the center stage 11 mate with the ball bearing assemblies 12, which themselves are mounted in V-shaped grooves in the side rails 23. Stability and accuracy not only require that the ball bearing assemblies 12 be perfectly true, but also require that all of the four V-groove surfaces associated with each ball bearing track 22 be perfectly parallel. This, of course, requires machining precision which is essentially impossible to achieve. However, if this level of machining precision is not achieved, the smallest surface irregularities and protrusions relative to parallelism may be the sole support point for the center block and thus act as an unstable pivotal mounting point.

Guide shafts 14—14 somewhat counteract this lack of stability and accuracy. In addition, the pair of side rails 23—23 mount the ball bearing assemblies 12 and in turn are mounted by screws 24 to the frame base 26 for lateral position adjustment by screws 27—27 which are secured in the fixed frame sides 28. The adjustment screws 27—27 compensate somewhat for deviations from parallelism in the center block groove 21 and in the ball bearing retainer groove. However, the adjusting screws introduce an undesirable stress into the stage components. Furthermore, the combination of the guide shafts 14—14 and the position-adjustable side mounting rails 23—23 cannot fully compensate for the inherent instability in the described ball bearing mounting arrangement.

In addition, the side rails 23—23 and the guide shafts 14—14 limit the area which is available for the laser aperture 13. This is important because, preferably, the laser aperture is large and encompasses a large proportion of the surface area of the center block 11. The reason is simple. For a laser beam of a given energy, a relatively large beam cross-section is usually easier to control and causes less damage to the optics system components than does a smaller, more intense beam. However, the size of the stage 10 and the center block 11 are limited by the relatively complex construction of the stage and, in particular, by the above-mentioned difficulty in precisely fabricating the center block and side rail grooves. Furthermore, the amount of the available stage surface area which could be used for the laser hole 13 is decreased by the stability-compensating guide shafts 14—14 and side rails 23—23, with the end result, shown in FIG. 1, that only a small percentage of the available center block area can be utilized for the laser transmission hole 13.

SUMMARY OF THE INVENTION

It is an object of the present invention to provide an improved, highly precise adjustable mount or stage which is suitable for use in optics systems such as laser systems.

It is another object to provide such an adjustable stage in which a large percentage of the stage area is available for beam transmission.

Still another object is to provide such an adjustable stage which is compact yet relatively simple in design.

In one embodiment, the adjustable mount or stage of the present invention includes a frame and a center block which is slidably mounted at each side thereof to the frame by two spaced ball-bearing track assemblies. An adjustment screw assembly is journaled to one side of the frame and extends into a mating tapped hole formed at one end of the center block so that rotation of the adjustment screw assembly in opposite directions is translated into opposite-direction translation of the center block parallel to the screw. In contrast to the conventional, elongated single track mounting, the spaced tracks support the center block at two spaced points, providing stable positioning of the center block and eliminating the tendency to pivot about surface irregularities or deviations from parallelism. In addition, elimination of the side rails and guide shafts and attaching the adjuster screw at the edge of the center block allows essentially the entire diameter of the center block to be occupied by the beam transmission hole.

A two axis, x, y-adjustable mount is provided by joining two of the above stages so that their adjustment screws and associated directions of the movement are oriented at right or other angles.

Additional objects, advantages and novel features of the present invention will be set forth in part in the description which follows, and in part will become apparent to those skilled in the art upon examination of the following, or may be learned by practicing the invention. The objects, features and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate a preferred embodiment of the invention and, together with the description, serve to explain the principles of the invention.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 2:
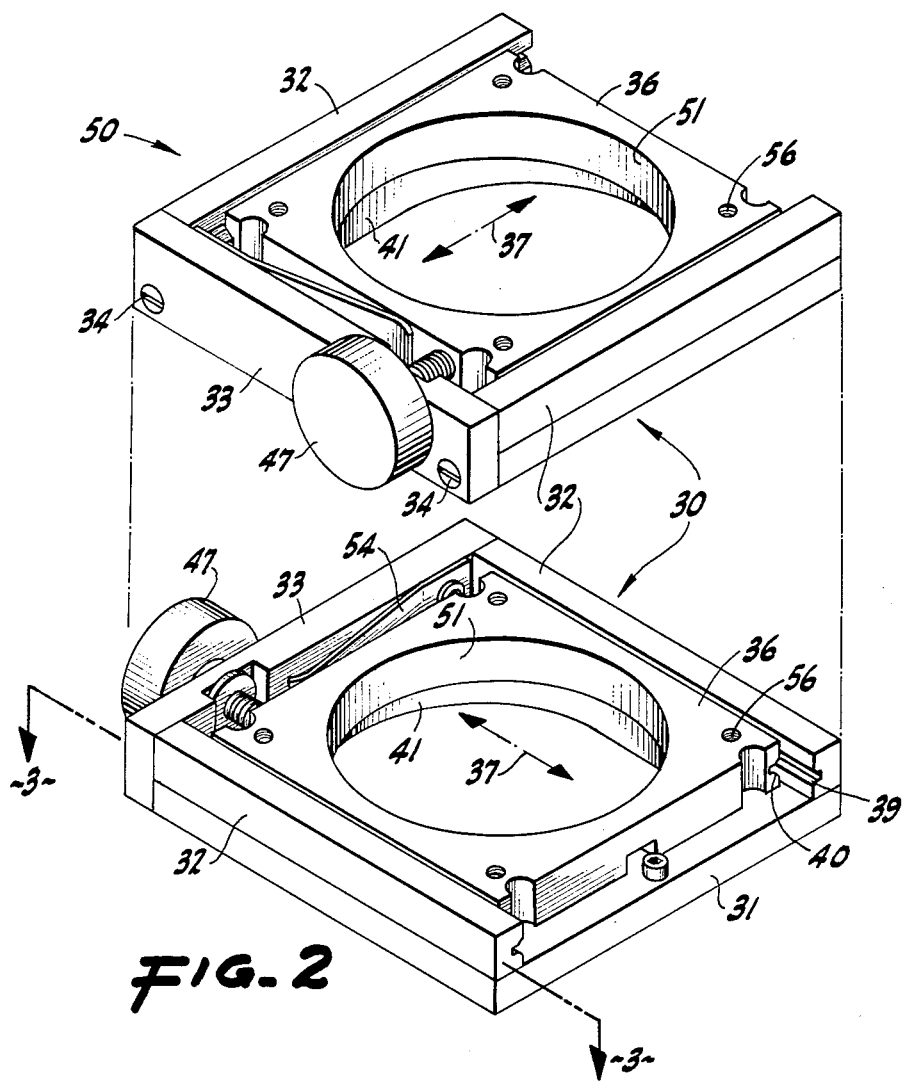
FIG. 2 is an exploded perspective view of an x, y-adjustable mount incorporating two adjustable stages which embody the present invention.
Figure 4:
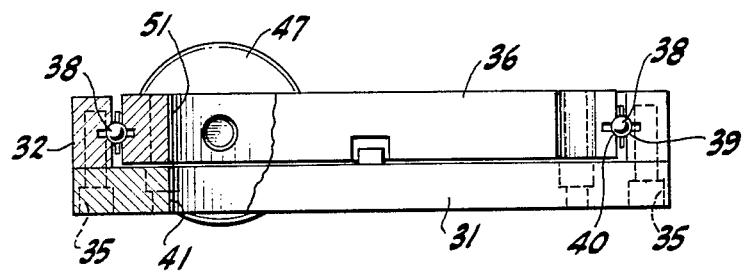
FIG. 4 is a partly schematic, elevational view taken along lines 4—4 in FIG. 3.

Referring to the perspective view depicted in FIG. 2, the simplified individual stage 30 which embodies my invention includes a base 31 and two opposite side members 32 which are mounted to the base by screws 35, FIG. 4. End plate 33 is mounted to the base 31 by screws 34. A second, opposite end plate can be similarly mounted, if desired.

Figure 3:
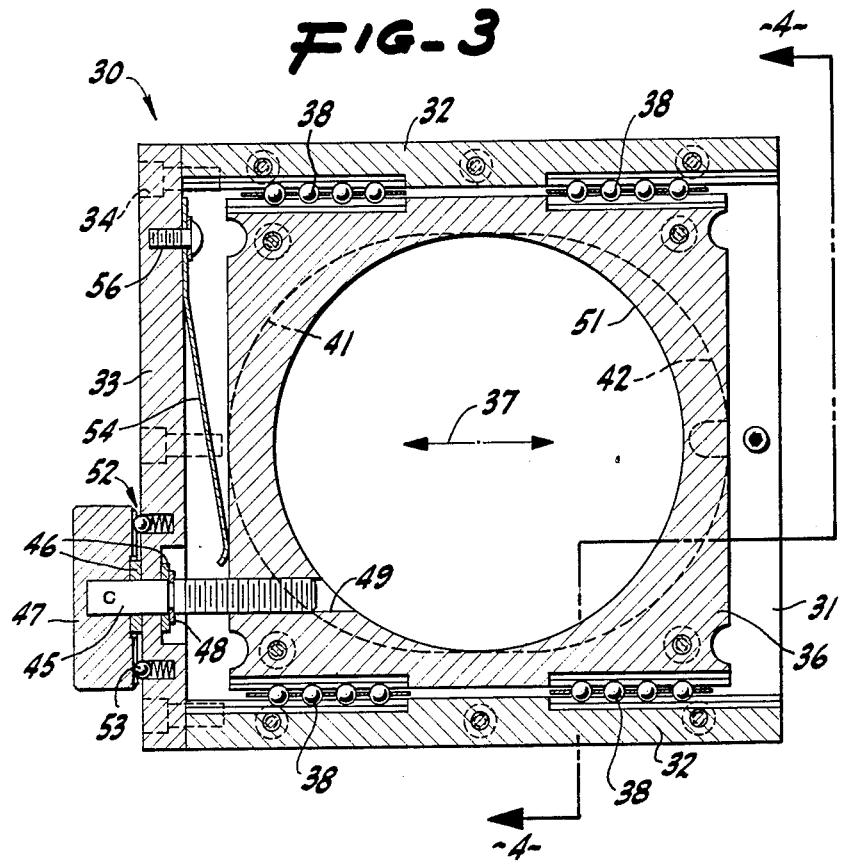
FIG. 3 is a horizontal sectional view taken along lines 3—3 in FIG. 2.

Referring also to the horizontal section view depicted in FIG. 3, a center block 36 is mounted between the side rails 32—32 for reversible translational movement, as indicated by arrow 37, between the limits of travel 41 and 42. As alluded to above, each side of the center block is supported by a pair of relatively short, spaced ball bearing tracks 38—38. Each side member 32 has a V-shaped groove 39 (FIG. 2) in which the tracks 38 are mounted. Similarly, each side of the center block 36 has a V-shaped groove 40 which rides along the fixed position ball bearing track 38.

Figure 1:
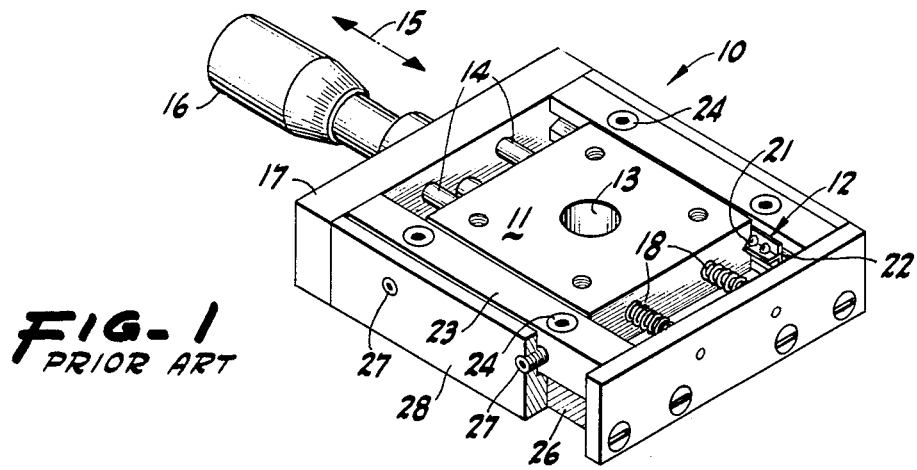
FIG. 1 is a perspective view of a prior art adjustable stage.

The construction of the tracks 38 can be similar to the x-shaped tracks used in the conventional adjuster stage 10, FIG. 1. However, the present stage 50 uses two spaced tracks to support each side of the center block 36. This ensures stable support of the center block 36 at each end thereof, i.e., this arrangement supports the center block at four spaced points. This also eliminates the prior art structural susceptibility to imperfectly machined surfaces. That is, in the conventional stage 10, FIG. 1, a surface irregularity in any one of the eight V-groove surfaces can result in a raised intermediate surface point that is the sole support on that side, in effect a pivot point, between the center block 11 and the track assembly 12. Furthermore, the four-point slide system which is used in stage 30 does not require special machining or adjustment or other custom manufacturing techniques to provide the improved slide precision and repeatability, and provides relatively simple, reliable construction.

As is best shown in FIG. 3, the stage 30 incorporates an adjustment screw 45 which is journaled through a hole formed adjacent one end of the end wall 33. Typically, a journal mounting is provided by washers 46—46 carried on the screw shank on opposite sides of the end wall 33. The washer 46 on one side of the wall 33 is retained by screw adjustment knob 47 and the washer 46 on the opposite side is retained by lock washer 48 which is mounted in a groove in the shank of screw 45. The threaded end of the screw 45 is threaded into a mating tapped hole 49 in the adjacent end of the center block 36. Reversible rotation of knob 47 thus advances or retracts the center block 36 and laser aperture 51 therein parallel to the adjustment screw 45 in the direction of the arrow 37.

Despite its off center position, the adjustment screw 45 contributes to stable adjustment, unlike the destabilizing adjustment provided by the micrometer 16, FIG. 1. The micrometer 16 pushes against the center block 11 and must be centrally located and requires guide shafts 14—14 to maintain the alignment of the center block 11. In contrast, in being threaded into the mating bore 49 in the center block 36 the adjustment screw 45 itself contributes to maintaining the proper alignment of the center block.

Preferably, one or more spring-biased ball detent assemblies 52 is incorporated in end wall 33 for biasing ball 53 thereof lightly against the adjustment knob 47 to securely hold the knob against unwanted rotation. Also, a torsion spring 54 (or, alternatively, a compression spring means) is mounted to end wall 33 by screw 56 for lightly biasing the center block 36 against the threads of the screw 45 to securely hold the center block against unwanted "play" or movement along the screw 45. The screw 45 functions as a bidirectional holding device or retainer which decreases play or backlash in the movement of the center block 36.

By using a serrated inner surface in the adjustment knob 47, i.e., in the surface facing the ball detents 52—52, the balls 53—53 prevent unwanted rotation and will provide graduated adjustment indication. That is, rotation of the knob 47 is then accompanied by audible clicks (or clicks which can be felt). Multiplying the center block 36 travel associated with one click of rotational movement times the number of clicks then provides the distance traveled.

As mentioned previously, two of the crucial features of my present invention are the enhanced stability and the increased size of beam transmission hole 51.

Specifically, the use of the spaced track pair 38—38 to mount the center block 36 provides stable center block orientation.

Secondly, the elimination of the side rail members 23—23, FIG. 1, which were required to compensate for the instability of the single track mounting; the use of the adjuster screw 45 which is threaded into one end of the center block 36; and the elimination of the guide rails 14—14 all cooperatively optimize the surface area of the center block 36 relative to the overall surface area of the stage 30 and also maximize the ratio of the aperture area:center block area. In fact, the diameter of the circular aperture 51 extends substantially the length of the center block 36, both from end-to-end and side-to-side.

FIG. 2 also illustrates an assembly of two stages 30—30 which form a two coordinate, x, y-adjustable stage system 50. Typically, aligned holes 56—56 in each stage permit insertion of screws for attaching one stage to the other. A right angle mounting is illustrated in which the axis of movement 37 of one stage 30 is oriented 90° to the axis 37 of the other stage. Various other angular orientations are possible, including parallel and 45° orientations.

The foregoing description of the preferred and alternative embodiments of the invention is presented for purposes of illustration and description. It is not intended to be exhaustive or to limit the invention to the precise form disclosed, and obviously many modifications and variations are possible in light of the above teaching. The preferred embodiment was chosen and described in order to best explain the principles of the invention and its practical application to thereby enable others skilled in the art to best utilize the invention and various embodiments and with various modifications as are suited to the particular use contemplated. For example, because of the high precision capability yet relatively simple and inexpensive manufacturing implementation of the present invention, it is suitable for use with all types of test and mounting equipment requiring the disclosed precision mounting and adjustment capability, including those applications which do not require a transmission hole, but mount an object on the center stage. It is thus intended that the scope of the invention be defined only by the claims appended hereto.

What is claimed is:

1. An adjustable mounting stage comprising:
   base means having two opposite sides and an end wall, each side including a pair of spaced ball bearing support means mounted proximate opposite ends of said base means without intermediate support means;
   a rectangular block adapted for sliding movement along the spaced ball-bearing support means; and
   an adjustment screw journaled at the end wall and threaded into one end of the block for reversibly moving the block along the ball-bearing support means;
   the adjustment screw including a knob for facilitating rotation, and said stage further comprising ball detent means between the end wall and the knob for preventing undesired rotation of the knob and associated movement of the block.

2. The adjustable mounting stage of claim 1, further comprising spring biasing means between the end wall and the block for preventing undesired movement of the block on the adjusting screw.

3. The adjustable mounting stage of claim 1, the block further comprising an aperture having a diameter substantially corresponding to the length and width of the block.

4. The adjustable mounting stage of claim 3, further comprising spring biasing means between the end wall and the block for preventing undesired movement of the block on the adjusting screw.

5. The adjustable mounting stage of claim 1, said stage being adapted for mounting a second mounting stage for providing adjustment along a second axis of movement.

6. Components for a two-stage mounting system, comprising a pair of adjustable mounting stages as set forth in claim 5.

* * * * *